Nov. 10, 1931.　　　　P. GRABLER　　　　1,831,594

SPRING

Filed Oct. 5, 1927

Inventor

Peter Grabler

By C. F. Heinkel

Attorney

Patented Nov. 10, 1931

1,831,594

UNITED STATES PATENT OFFICE

PETER GRABLER, OF ROCKY RIVER, OHIO

SPRING

Application filed October 5, 1927. Serial No. 224,131.

My invention relates to springs generally and more particularly to forms of parts of springs and still more particularly to shock absorbing elements on springs.

The present invention is distinguished from my former application Serial No. 207,913 in a new clamp element and the shock absorbing element integral with a part of the spring whereas the shock absorbing element in my former application is separate and attachable to and detachable from springs.

One of the objects of the present invention is to provide springs with permanent shock absorbing means having a tensional relation to and with the springs and to provide a means for adjusting or varying this tensional relation and retain this means in position and in adjustment. Other objects will appear, or become apparent or obvious, or will suggest themselves during the description of the devices shown in the accompanying drawings and related remarks in this description.

I am aware that various forms of springs and shock absorbing means and clamp means as well as various combinations of such elements can be designed within the scope of the present invention.

In order to illustrate my invention and to avoid possible confusion, I have selected one particular structure and arrangement and combination of elements or parts and have shown the same in the accompanying drawings and will describe the same herein in detail and also show in the accompanying drawings one modification and will briefly describe the same herein to indicate generally that modifications can be made and how they can be made in one direction. However, this illustrating and describing shall not limit my invention to the particular devices so shown and described.

In the accompanying drawings:—

Similar reference characters refer to similar parts through the views.

Figure 1:
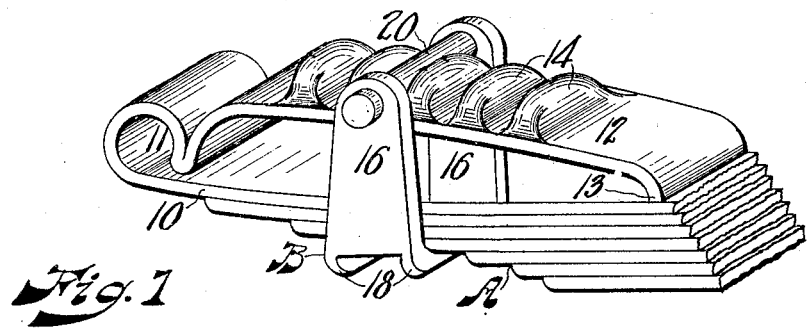
Fig. 1 is a general perspective view of one end of a leaf spring embodying the features of my invention and having one of the leaves bent into a shock absorbing element superimposed over a portion of the spring and a clamp means superimposed over the shock absorbing element and the spring.

The drawings show one end of springs; the other end may be formed in the same manner, or in a different manner, embodying features of my invention or otherwise, or may be formed with the usual or any special eye or other supporting or attaching means.

The spring A, in the present instance a leaf spring, has a plurality of leaves as is common in such springs.

In the present instance, one of the leaves, designated as 10, is formed with the eye 11 extending upwardly in this instance and with the shock absorbing part 12 curved upwardly in this instance and with the toe 13 depending from the part 12 and abutting the leaf 10 and superimposedly extending over and spaced from a portion of the leaf 10 and with the ridges 14 pressed upwardly in the part 12 to form the channels 15 to retain the hereinafter described clamp element in position.

Figure 2:
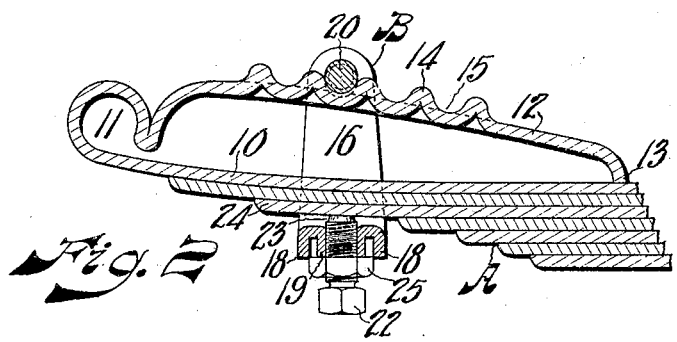
Fig. 2 is a section taken in a vertical plane longitudinally through the middle of the spring of Fig. 1 and shows the longitudinal relations of the elements more clearly.
Figure 3:
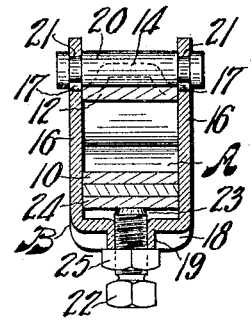
Fig. 3 is a section taken in a vertical transverse plane through the middle of the clamp means of Fig. 1 and shows the transverse relation of the elements more clearly.

The clamp element, as shown in Figs. 1, 2 and 3, comprises a U shaped element and a pin element. The U shaped element B is made of sheet metal bent to form a pair of legs 16 having the aligned holes 17 through the same and further bent to form a pair of stiffening flanges 18 and further bent to form the boss 19.

The pin 20, of a diameter to pass through the holes 17 and of a length sufficient to extend beyond the legs 16, has the grooves 21 near each end thereof and spaced the same distance apart as the distance between the legs and of a width corresponding to the thickness of the material around the holes, The screw 22 is threaded into the boss 19 and the point or end 23 thereof abuts the leaf 24 when the device is assembled.

To assemble the device:—The U shaped element is first superimposed over the spring and over the shock absorbing element in a position where it will not interfere with spring clips or other parts of the spring or other elements and where the holes in the legs thereof align with one of the channels 15. The pin is then inserted into and through the holes 17 until the grooves therein align with the material around the holes. The screw 22 is then manipulated so that the legs are moved downwardly, the pin remaining stationary in the channel, and thereby move the portions of the legs adjacent to the holes therein into the grooves 21 and thereby fixedly locking the pin and the element B together. This same screw 22 is also utilized to adjust or vary the tensional relation between the spring and the shock absorbing element by tightening or loosening the same more or less against the leaf 24. The check nut 25 retains the adjustment of the tension. The manipulation of the screw 22 for adjusting purposes does not release the lock between the pin and the member B.

The body portion of the shock absorbing element forms a spring of itself between the eye of the spring and the toe of the element the tension of which is adjustable or variable in relation to the spring as a whole and to that portion of the spring over which the element extends.

The shock absorbing element shown and described is capable of quicker action than the spring itself and therefore absorbs shocks quicker than the spring itself could absorb them and thereby eliminates or absorbs shocks which can not be eliminated or absorbed by the spring itself.

Figure 4:
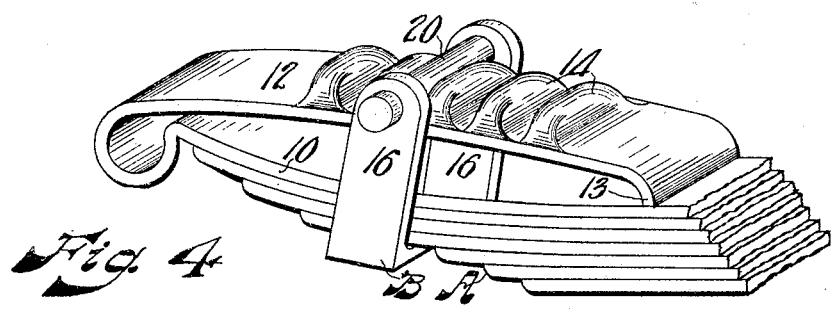
Fig. 4 is a general perspective view of a modification of Fig. 1.

The modification shown in Fig. 4 embodies all of the features described above and shows the eye 11 as extending downwardly from the leaf 10 and the element B as made of a casting or forging.

Since I am aware that modifications and structural changes of elements as well as changes in the arrangement and combination of the elements shown and described can be made, I do not limit myself to the precise application nor structure nor arrangement nor combination of elements as shown and described and therefore, without limiting myself thusly.

I claim:—

1. A spring having a clamp element, a shock absorbing element formed with ridges to locate said clamp element, and a screw threaded into said clamp element to vary the tensional relation between said spring and said shock absorbing element and to retain said clamp element in position.

2. A spring having a clamp element comprising a member having a pair of legs with aligned holes through the same, a pin extendable through said holes and having a groove near each end thereof and a screw threaded into said member and adapted to move and to retain said legs so that a portion thereof adjacent to said holes engages the corresponding one of said grooves and thereby locks said pin and said member together.

3. A spring having a clamp element comprising a member formed of sheet metal bent into a pair of legs and stiffening flanges and a boss, the ends of said legs having aligned holes through the same, a pin extendable through said holes and having a groove near each end thereof, and a screw threaded into said boss and adapted to move and to retain said legs so that a portion thereof adjacent to said holes engages the corresponding one of said grooves and thereby locks said pin and said member together.

4. A spring including a member formed with a shock absorbing element having the end thereof abutting endwise on said member.

5. A leaf spring including a leaf having an end portion thereof formed into a shock absorbing element and the end thereof endwise abutting the same leaf and movable thereon longitudinally thereof.

6. A leaf spring including a leaf having an end portion thereof formed into a shock absorbing element extending over a portion of said leaf and the end thereof abutting endwise on said leaf and movable thereon longitudinally thereof.

7. A leaf spring having a plurality of superimposed leaves the last superimposed leaf formed with a shock absorbing element having the end thereof endwise abutting said leaf.

8. A leaf spring including a leaf having an eye and a shock absorbing element formed thereon.

9. A spring having a shock absorbing element integral with a part of the spring and superimposed over an end portion of the spring and endwise abutting the spring, and a clamp element superimposed over a portion of the spring and over a portion of the shock absorbing element.

10. A spring having a shock absorbing element integral with a part of the spring and superimposed over an end portion of the spring and endwise abutting the spring, a clamp element superimposed over a portion of the spring and over a portion of the shock absorbing element, and means for adjusting said clamp element to vary the tensional relation between the spring and the shock absorbing element.

11. A spring having a shock absorbing element formed on a part of the spring and superimposed over an end portion of the spring and endwise abutting the spring and means for adjusting the tensional relation between the spring and the shock absorbing element.

12. A spring having a resilient shock absorbing element formed on a part of the spring and endwise abutting a leaf of the spring and means for adjusting the resilient and the frictional relation between the spring and the shock absorbing element.

13. A leaf spring including a leaf having a shock absorbing element integral with the same, extending over an end portion of the spring, endwise abutting the spring and the end thereof free to move longitudinally of the spring.

14. In a leaf spring, a plurality of spring leaves, one of which has an extenion at an end thereof designed to form an auxiliary spring bow endwise abutting a leaf of the spring, and means for placing said bow under compression to thereby yieldingly urge the end of said bow and adjacent surfaces of the spring leaves into mutually co-operating contact.

15. In a leaf spring provided with a supplemental resilient member extending from the eye of the spring and having contacting portions and an outwardly disposed non-contacting portion, one of said contacting portions abutting endwise of a leaf of the spring, and means for tightening said portions towards the spring.

16. A vehicle spring comprising laminated leaves, a clamp embracing the longer leaves adjacent the spring end, one of the leaves being bowed in the clamp from the eye of the spring inwardly thereof and abutting endwise on a leaf of the spring, and means carried by the clamp for adjusting the tension of the bowed portion.

In testimony of the foregoing I affix my signature.

PETER GRABLER.